United States Patent

[11] 3,599,191

[72] Inventor John B. Gillett
Whitenap, Romsey, England

[21] Appl. No. 820,424
[22] Filed Apr. 30, 1969
[45] Patented Aug. 10, 1971
[73] Assignee International Business Machines Corporation
Armonk, N.Y.
[32] Priority May 2, 1968
[33] Great Britain
[31] 20766/68

[54] DATA STORAGE APPARATUS
8 Claims, 7 Drawing Figs.

[52] U.S. Cl. .......... 340/174 TF, 340/174 SB, 340/174 WA, 340/174 DC, 340/174 M
[51] Int. Cl. .......... G11c 11/14, G11c 5/02, G11c 7/00
[50] Field of Search .......... 340/174, 166

[56] References Cited
UNITED STATES PATENTS

| | | | |
|---|---|---|---|
| 3,028,581 | 4/1962 | Thorpe .......... | 340/166 |
| 3,421,153 | 1/1969 | Bartik et al. .......... | 340/174 |
| 3,421,016 | 1/1969 | Flannery .......... | 307/88 |

*Primary Examiner*—Stanley M. Urynowicz, Jr.
*Attorneys*—Hanifin and Jancin and Stephen J. Limanek ABSTRACT: A magnetic film memory is non-destructively interrogated by applying an oscillatory signal of frequency f to a selected word line. Output data signals of frequency 2f are generated on the bit lines as a result, the phase of which is characteristic of the information stored. Superimposed on each data signal is a capacitive noise signal of frequency f. The composite signal on each bit line is passed to a filter network which separates the capacitive noise component from the data component. The data signal is sampled once per cycle under control of strobe signals generated from the capacitive noise signal. The strobe signals are timed to coincide with a region of maximum fluctuation of the data signal, the sampled signals indicating the phase of the data signal and hence the binary value stored.

INVENTOR.
JOHN B. GILLETT
BY Stephen J. Limanek
ATTORNEY

DATA STORAGE APPARATUS

BACKGROUND OF THE INVENTION

This invention relates to data storage apparatus of the kind in which an oscillatory input signal is applied to a data storage element and the phase of the output signal indicates the data stored in the device. The data storage devices use the oscillatory input signal as a phase reference for detection of the phase of the output signal.

SUMMARY OF THE INVENTION

According to the invention a data storage device includes a storage element having an input line and an output line, means for applying an oscillatory signal to the input line whereby a signal is produced in the output line which includes an information bearing component having a harmonic relationship to the oscillatory signal and a phase indicative of the information stored by the storage element and a capacitive noise component at the frequency of the oscillatory signal, and detection circuitry in which the phase of the information bearing component is detected with reference to the capacitive noise component.

In this specification and in the appended claims "harmonic relationship" between two signals or signal components means that the frequency of one signal is an integral multiple or submultiple of the frequency of the other signal.

Where high frequencies, for example from 10 to 100 MHz., are used the propagation delay along the input and output lines may be sufficient to render a phase determination by conventional techniques of uncertain accuracy. Moreover, where the data store includes a number of storage elements, the propagation delays are different for different elements and the problem cannot conveniently be overcome by the insertion of delay elements to compensate for propagation delays.

In many modern memories capacitive noise generated in the output line due to capacitive coupling between input and output lines has presented problems and steps have been taken to reduce or cancel this noise. In a data store embodying the invention constructive use is made of the capacitive noise component of the output signal by using it as a phase reference for detecting the phase of the information bearing component of the output signal. It will be understood that this technique is applicable only to storage elements in which the information component is at a different frequency, for example, double the frequency of the capacitive noise components.

The data storage element may be an anisotropic magnetic film element.

A preferred embodiment of the invention is a magnetic film memory comprising an array of anisotropic magnetic film data storage elements arranged in rows and columns, each having an easy axis of magnetization extending transversely of the rows, a plurality of word lines each extending along a respective column of the array, a plurality of bit lines each extending along a respective row of the array, means for selectively applying an oscillatory signal of frequency $f$ and of amplitude insufficient to effect a permanent change of the magnetized state of the magnetic film elements to any one of the word lines, and detection circuitry coupled to the bit lines for detecting the phase of signals of frequency $2f$ induced in the bit lines relative to capacitive noise signals of frequency $f$ produced in the bit lines by the oscillatory signal to indicate the direction of magnetization of and the data stored by magnetic film elements in the column corresponding to a selected word line.

It has been found that a particularly low cost form of magnetic film memory embodying the invention can be constructed by using tuned switches for gating of the input and output oscillatory signals. A 2½D organization may be used in such a memory to permit the sharing of detection circuits between a number of groups of output or bit lines because the oscillatory read out technique employed is intrinsically nondestructive.

BRIEF DESCRIPTION OF THE DRAWINGS

The invention will now be described with reference to the accompanying drawings, in which.

DETAILED DESCRIPTION OF INVENTION

Memory Organization

Figure 1:
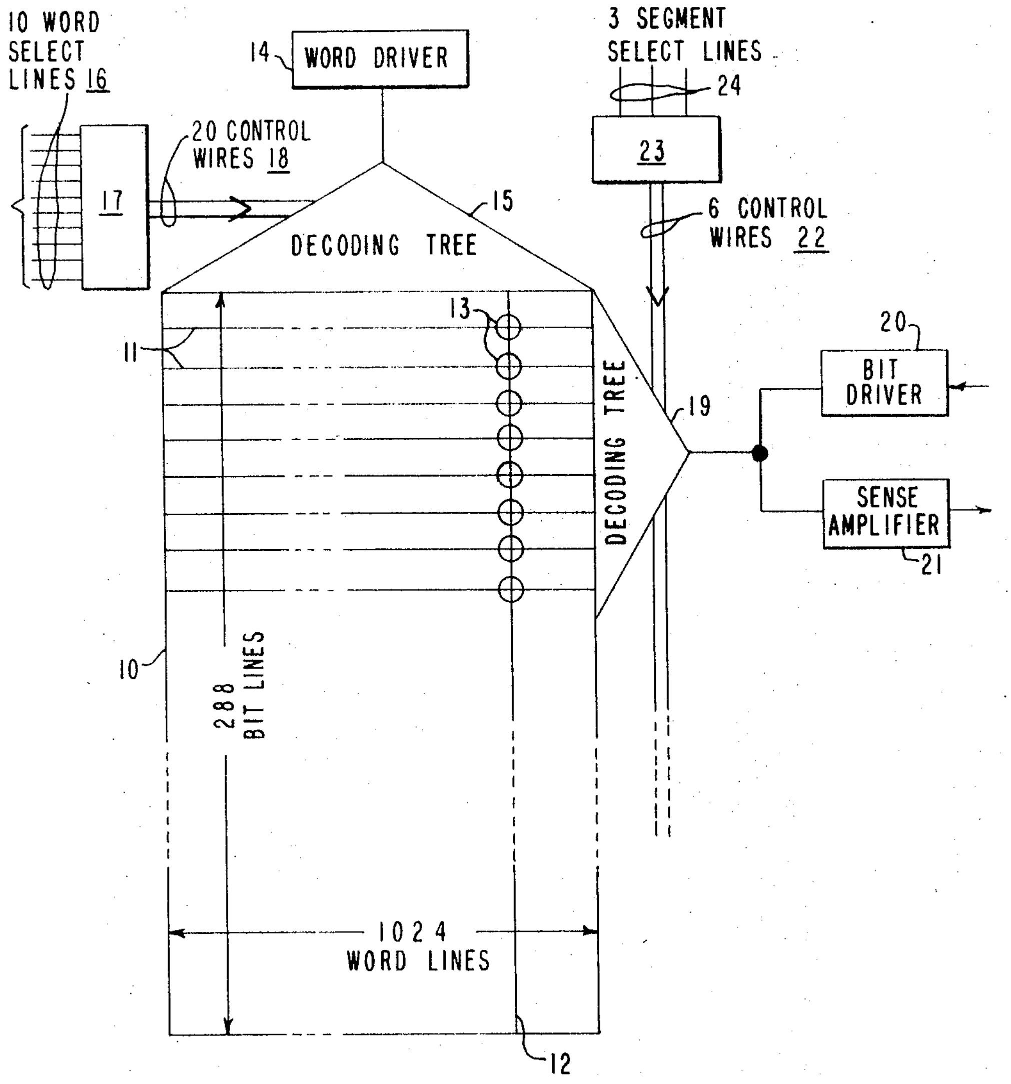
FIG. 1 is a schematic diagram of a magnetic film memory embodying the invention.

The overall configuration of a magnetic film memory embodying the invention is shown in FIG. 1. The memory comprises a 288 ×1024 array 10 of anisotropic magnetic film elements 13 having 288 bit lines 11 arranged in 36 groups of eight extending along the rows of magnetic film elements 13 and 1024 word lines 12 extending along the columns of magnetic film elements 13. It will be understood that the numbers of word and bit lines are specified only by way of example and that many different size configurations are possible.

The anisotropic magnetic film elements 13 at the intersections of the bit lines with the word lines may be single film elements as described for example, in commonly assigned U.S. Pat. No. 3,126,529, or they may be coupled film elements as described for example, in commonly assigned U.S. applications having Ser. Nos. 357,417 and 364,982, filed Apr. 6, 1964, and May 5, 1964, now U.S. Pat. Nos. 3,461,438 and 3,484,756, respectively.

Each magnetic film element has an easy axis which extends substantially parallel to its associated word line. A data bit is stored in each film element 13 as a magnetization in one direction or the opposite direction along the easy axis.

A word driver circuit 14 is selectively connectable to any one of the word lines 12 by a decoding tree 15. The particular word line selected is determined by a 10 bit address applied to 10 word select lines 16. A group of 10 DC amplifiers 17 develops control signals on control signal bus 18 in response to the address on word select lines 16 for controlling the particular word line selected by the decoding tree 15.

The bit lines 11 of the array 10 are arranged in 36 groups of eight lines each having a respective decoding tree 19. Each decoding tree 19 selects one of its associated group of bit lines 11 for connection to bit driver circuit 20 during a writing operation or to sense amplifier 21 during a reading operation. All 36 decoding trees 19 are controlled by six control wires in control wire bus 22. The signals on the six control wires 22 are generated by 3 DC amplifiers 23 selected by a 3-bit segment address supplied to the 3 DC amplifiers 23 on segment select lines 24.

Data is entered into and read out from the memory on a 36-bit data bus, not shown in FIG. 1, which is connected to the bit drivers 20 and sense amplifiers 21.

During a write operation a 13-bit address including 10-word select bits and 3-segment select bits is supplied to the memory to effect connection of the word driver circuit 14 to one of the word lines and to connect one bit line from each group of bit lines to the respective bit driver circuit 20. The word driver 14 develops an oscillation of frequency $f$, for example, 25 MHz., and each of the bit driver circuits 20 develops an oscillatory bit drive signal of frequency $2f$, for example, 50 MHz. The amplitude of these signals are such that they do not irreversibly disturb the magnetic state of a magnetic film element 13 when applied individually thereto, but when applied in combination, i.e. at the intersection of the selected word line with the selected bit lines, they are effective to magnetize the magnetic film elements at those intersections in a direction determined by the phase of the bit drive signals relative to the phase of the word drive signals. Thus the phase of the signals produced by the individual bit driver circuits 20 are defined in accordance with the data to be written into the store. The particular phase-relation between these signals and the magnetic fields to which the elements are subjected during a write operation will be described in more detail below.

During a read operation a 13-bit address is supplied to the memory to connect the word driver 14 to a selected word line and to connect each of the sense amplifiers 21 to a selected one of its associated group of bit lines. An oscillatory word drive signal of frequency $f$ is then applied by the word driver circuit 14 to the selected word line 12. The effect of the word drive signal on the magnetic film elements is to produce an oscillatory signal in each of the 288-bit lines of frequency $2f$ with a phase which is dependent upon the direction of magnetization and the data stored in the magnetic film element at the intersection of that bit line with the selected word line. The manner in which these read out signals are induced in the bit lines will be described in more detail below. Superimposed on the signals of frequency $2f$ in each of the bit lines is a capacitive noise signal of frequency $f$ due to the capacitive coupling between the word lines and the bit liens. Each sense amplifier 21 receives the read out signal of frequency $2f$ from the selected bit line in its associated group of bit lines and superimposed on this read out signal is the combined capacitive noise signal from all of the bit lines of the associated group. Each sense amplifier 21 detects the phase of the read out signal of frequency $2f$ with reference to the superimposed capacitive noise signal to determine the data stored in the selected word storage location.

Decoding Tree

Since all the signals used for both writing into and reading out of the memory are oscillatory and of the same frequency for both reading and writing, it is possible to use tuned switches in the decoding trees 15 and 19. In the particular embodiment of the invention described herein the decoding trees 15 and 19 are of similar construction except that the switches of decoding tree 15 are tuned to frequency $f$ and the switches of decoding trees 19 are tuned to frequency $2f$.

Figure 2:
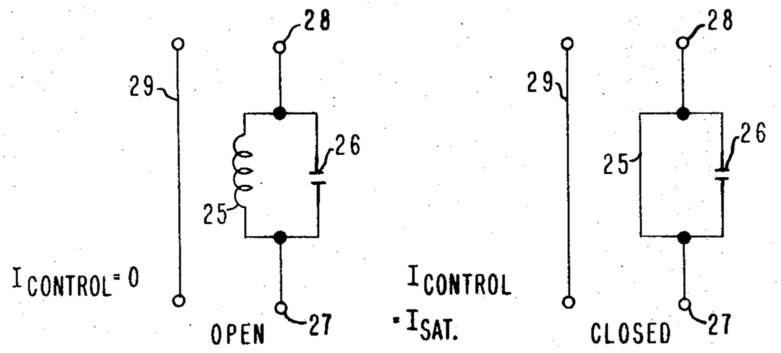
FIG. 2 shows a tuned switch in open and in closed states.

A suitable form of tuned switch is shown in both open and closed states in FIG. 2. The tuned switch comprises a saturable inductor 25 connected in parallel tuned circuit with a capacitor 26 between input terminal 27 and output terminal 28. A control line 29 controls the inductance of the saturable inductor 25. When the current in the control conductor 29 is zero the saturable inductor 25 resonates with the capacitor 26 and presents a high impedance to signals at the resonant frequency applied to input terminal 27. When a control current equal to the saturation current of the saturable inductor 25 is applied to the control line 29, the saturable inductor 25 presents negligible inductance and the switch presents a negligible impedance to an oscillatory signal applied to the input terminal 27. The switch always presents a low impedance to signals of frequency other than the resonant frequency of the switch.

Figure 3:
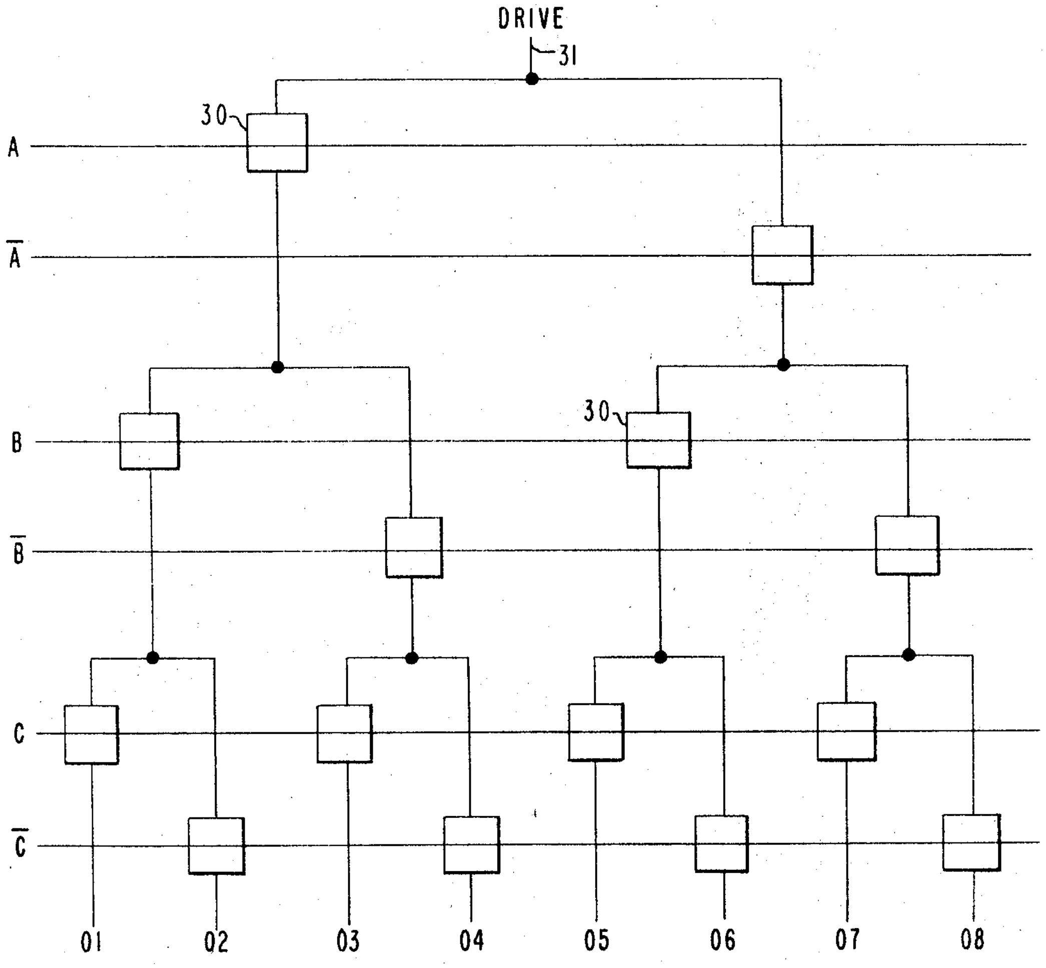
FIG. 3 shows a group of tuned switches of the kind shown in FIG. 2 connected together to form a decoding tree suitable for the memory of FIG. 1.

A number of tuned circuits 30 of the kind shown in FIG. 2 are connected together as shown in FIG. 3 to form a decoding tree. The tuned circuits of the decoding tree shown in FIG. 3 are arranged in three levels each having two control lines served by complementary control signals A and $\overline{A}$, B and $\overline{B}$, and C and $\overline{C}$. By selectively applying a control signal to one control line of each pair of control lines the decoding tree presents a negligible impedance to signals at the resonant frequency of the tuned circuits 30 between the drive input 31 and a selected one of the binary coded output lines 01 through 08.

The decoding tree illustrated in FIG. 3 is of the configuration required for decoding trees 19 which select the bit lines of the memory when the resonant frequency of the tuned circuits will be frequency $2f$. The configuration of a similar decoding tree constructed with tuned circuits having a resonant frequency $f$ suitable for decoding tree 15 for selecting the word lines is apparent by analogy with the configuration shown in FIG. 3.

The decoding trees 19 will thus present negligible impedance to signals on the associated bit lines of frequency $f$ irrespective of the combination of signals applied to the control lines and thus the combination of the capacitive noise signals $f$ of all the bit lines of each group will appear at the output of each decoding tree 19.

Detection Circuitry

Figure 7:
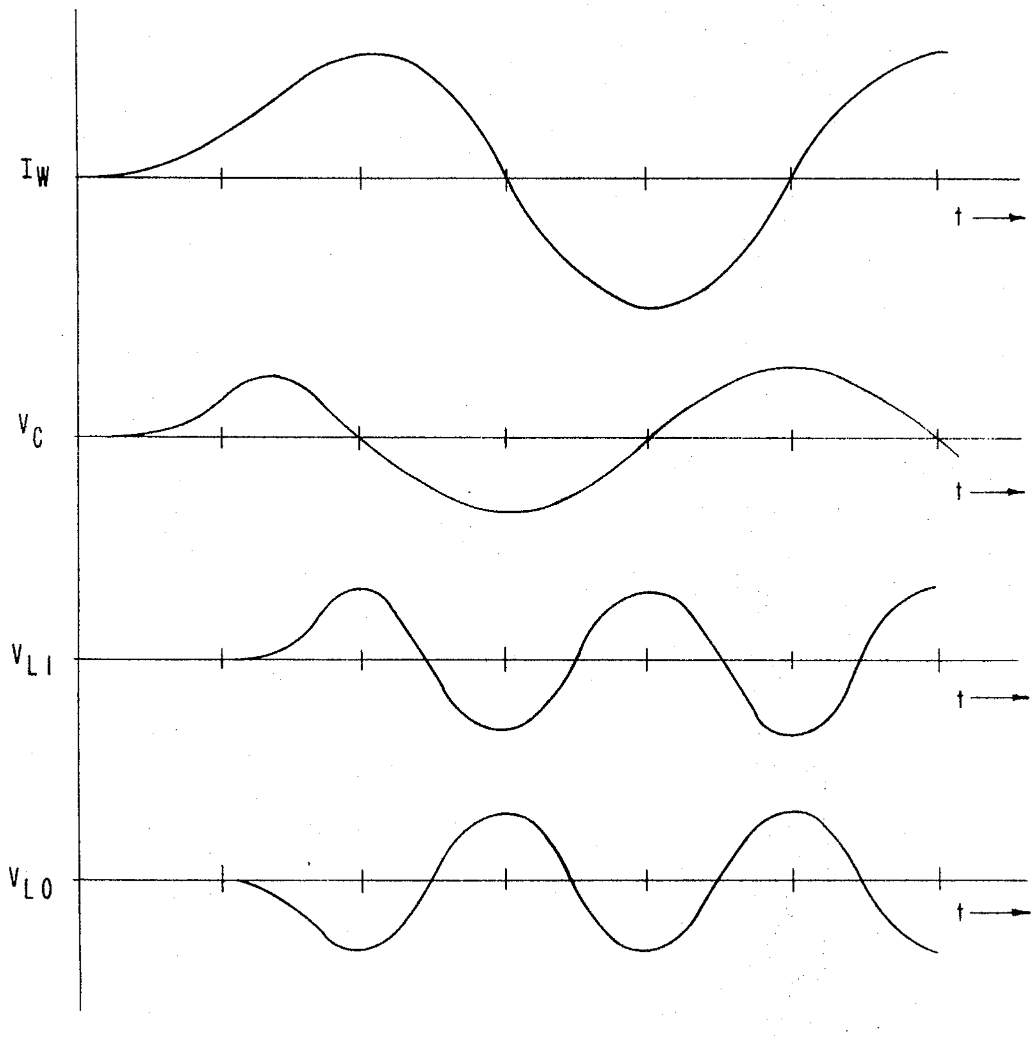
FIG. 7 shows input and output waveforms during read operation of the memory of FIG. 1.

As described above, an oscillatory word drive signal of frequency $f$ is applied to a selected word line during a read operation. The effect of this signal on a magnetic film element in the selected word line is to oscillate the magnetization vector of the element about the easy axis direction. The amplitude of the word drive signal is selected such that the peak value of the signal is insufficient to rotate the magnetization vector by an amount which would destroy the information stored in the magnetic film element so that when the oscillatory word drive signal is discontinued the magnetization vector is restored to the orientation which it had before application of the signal. During application of the word drive signal the magnetization vector has a component in the easy axis direction of the magnetic film element whose amplitude varies sinusoidally at frequency $2f$. This varying component of magnetization in the easy axis direction induces a readout signal of frequency $2f$ in the bit line associated with the magnetic film element. If the element is storing a binary zero so that the magnetic film element is magnetized in one direction parallel to the easy axis, the read out signal has a first phase, and if the magnetic film element stores a one so that the element is magnetized in the opposite direction parallel to the easy axis, the read out signal is in a second phase 180° out of phase with the read out signal for an element storing a binary zero. The relative phases of the read out signals for elements storing binary one and binary zero are shown in FIG. 7.

The upper waveform shows the word drive signal $I_W$ of frequency $f$, the third waveform shows the read out signal $V_{L1}$ for a binary one and the fourth waveform shows the readout signal $V_{L0}$ for an element storing a binary zero. The second waveform shown in FIG. 7 shows the capacitive noise component $V_C$ of the signal on the bit line. It will be seen from FIG. 7 that the capacitive noise component is of frequency $f$ and is 90° out of phase with the word drive signal.

Figure 4:
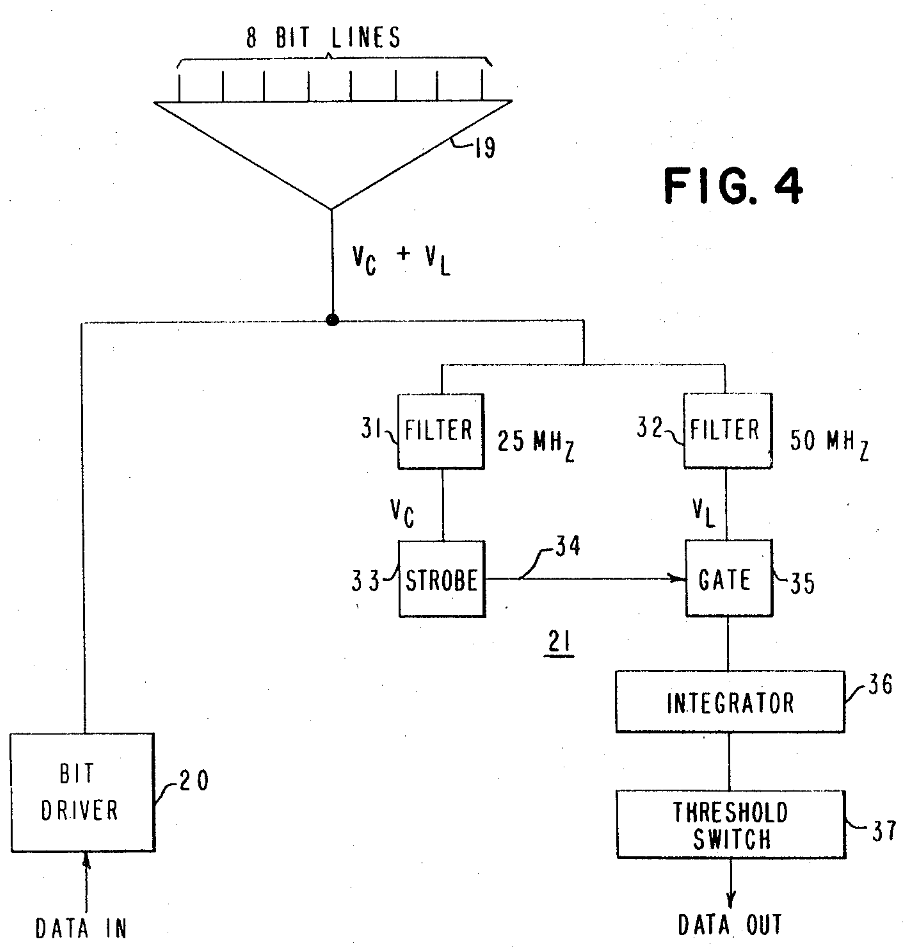
FIG. 4 shows a sense amplifier and bit driver circuit for the memory of FIG. 1.

FIG. 4 shows one of the sense amplifiers 21 for decoding the phase of the readout signal components $V_L$ with reference to the capacitive noise component $V_C$. The output from the decoding tree 19 including components $V_C$ at frequency $f$ and $V_L$ at frequency $2f$ is supplied to a first band pass filter 31 tuned to frequency $f$ which selects the component $V_C$ and to a second band pass filter 32 tuned to frequency $2f$ which selects the component $V_L$. The output of the first band pass filter 31 is supplied to a strobe circuit 33 which develops a series of strobe pulses on output line 34, each of which correspond to a zero crossing of the capacitive noise component $V_C$. Hence the repetition rate of the strobe pulses is at frequency $2f$. The output of the second band pass filter 32 is supplied to a gate circuit 35 which is enabled by the strobe pulses on line 34. Reference to the waveforms of FIG. 7 will show that the output of the gate circuit 35 will be a series of pulses of positive polarity if the read out signal $V_L$ is from a magnetic film element storing a binary one and is a series of negative pulses if the read out signal $V_L$ is from a magnetic film element storing a binary zero. The output of the gate circuit 35 is integrated in integrator 36 and the output of the integrator 36 is supplied to a threshold switch 37 which switches to a state indicative of a binary one when the output of the integrator exceeds a predetermined positive level and to a state indicative of a binary zero when the output of the integrator falls below a predetermined negative value.

The combined outputs of threshold circuits 37 in the 36 sense amplifiers 21 thus provide a 36-bit data signal corresponding to the data stored in a selected word storage location of the memory.

Write Operation

Figure 6:
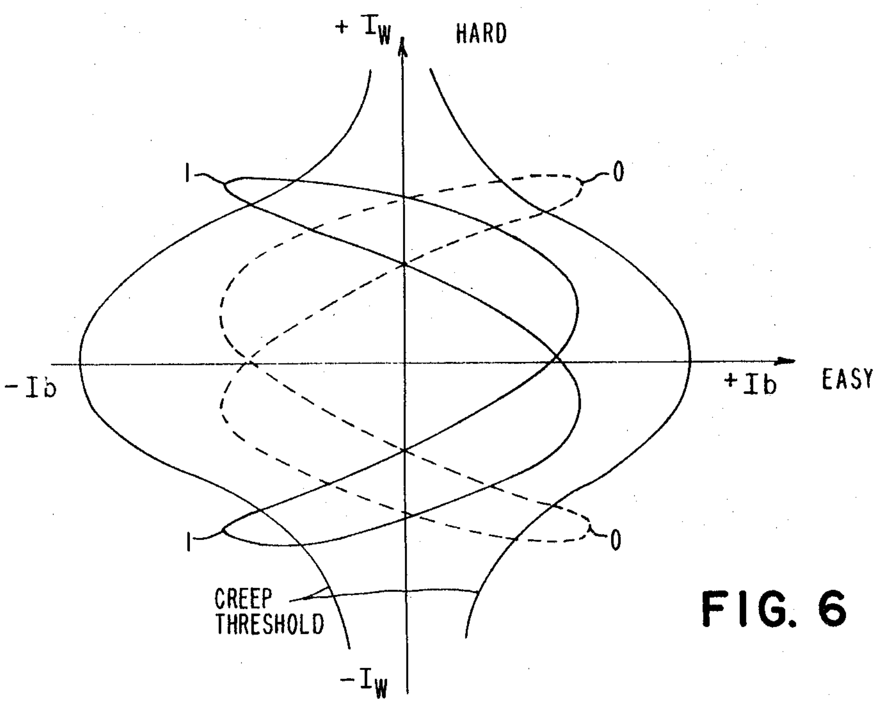
FIG. 6 shows the asteroid plot of a typical anisotropic magnetic film element used in the memory of FIG. 1 illustrating the magnetic fields to which the element is subjected during a write operation.

FIG. 6 shows an asteroid plot for a typical anisotropic magnetic film element. The curves in FIG. 6 labeled "creep threshold" indicate a boundary for the applied magnetic field such that if the element is magnetized originally in one direction along the easy axis and a magnetic field is applied repetitively to the magnetic film element which falls outside the creep threshold in the opposite direction, the film will switch its state of magnetization to the direction of the applied magnetic field. The creep threshold illustrated in FIG. 6 lies within the normal asteroid plot showing switching thresholds for DC currents applied to the word and bit lines and its actual shape depends on the thickness, shape and manufacture of the film element, but in general has a shape similar to that shown in FIG. 6.

Figure 5:
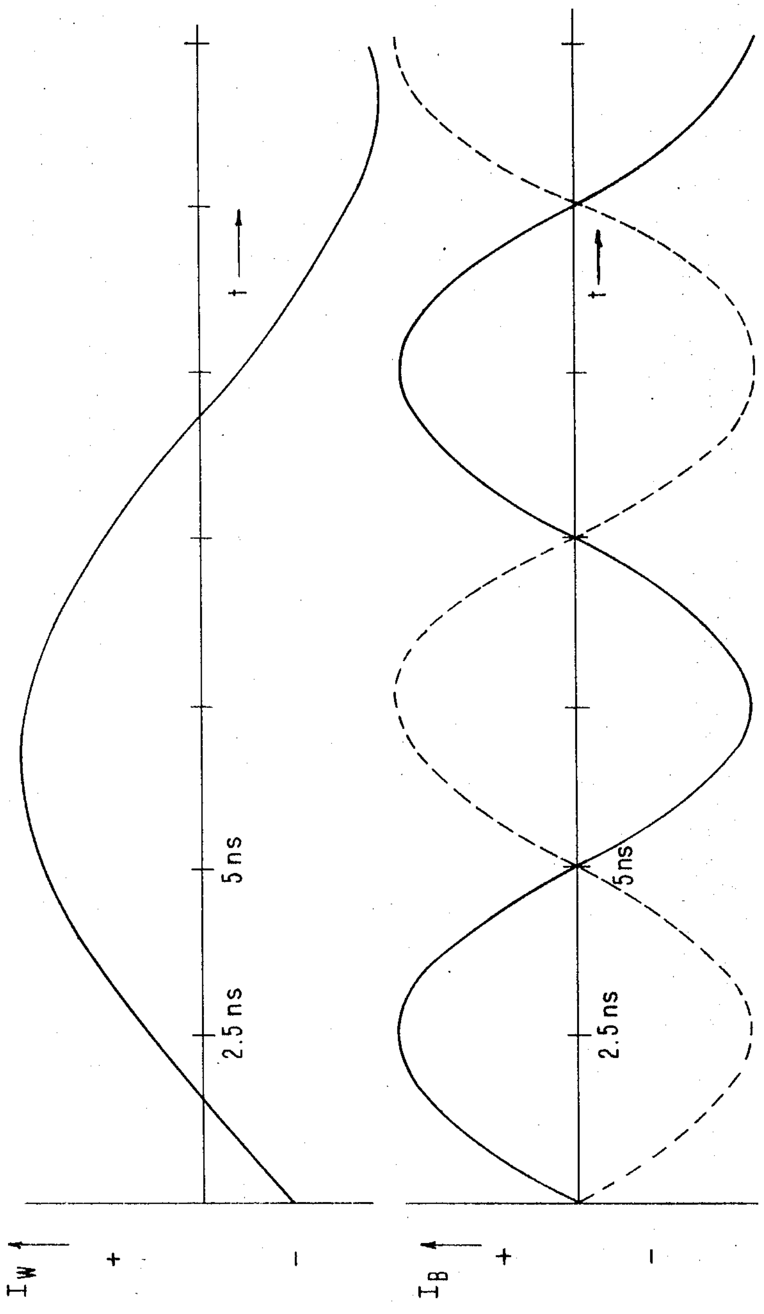
FIG. 5 shows input and output waveforms during write operation of the memory of FIG. 1.

During a write operation an oscillatory signal of frequency $f$ is applied to a selected word line and the bit drivers 20 apply oscillatory bit drive signals of frequency $2f$ to selected bit lines. Thus a magnetic film element at the intersection of selected word and bit lines is subjected to a varying field film vector which has a component of frequency $f$ in the hard axis direction and a component of frequency $2f$ in the easy axis direction. The path traced by the magnetic field vector on the plot of FIG. 6 depends on the phase relationship between the word and bit signals. The particular phase relationship used in the memory of FIG. 1 is shown in FIG. 5. The upper waveform in FIG. 5 shows the variation of word current with time and the lower waveforms show the variation of bit current with time both for writing a binary one (continuous line) and for writing a binary zero (dotted line). The variation of the magnetic field vector to which a magnetic film element is subjected during a writing operation is illustrated in FIG. 6, the particular curves concerned being labeled one and zero. It will be seen from FIG. 6 that when a zero is written the magnetic field vector passes outside of the creep threshold only at the right-hand side of FIG. 6 so that the result after the word and bit currents are removed is that the magnetic film element is magnetized in the positive direction as illustrated in FIG. 6. Similarly, the variation of the magnetic field vector during the writing of a binary one is such that it passes outside the creep threshold only on the left-hand side of the curve shown in FIG. 6 and the element is magnetized in the negative direction.

The magnetic field vector at no time during writing passes outside the threshold for writing with a DC magnetic field and writing only occurs as a result of a number of excursions of the magnetic field vector outside the creep threshold. The amplitude of the word current for writing can be the same as the amplitude of the word current for reading which means that only one word driver circuit is required for both writing and reading.

The memory described herein has a relatively slow writing and reading cycle time because a number of cycles of the oscillatory signals are required to effect both reading and writing. It is, however, suitable for application to very large memories because the circuitry is of relatively low cost and the circuits which are required are shared between a large number of storage locations.

The memory described is suitable for manufacture by integrated circuit techniques when the array of magnetic films and the decoding trees could be implemented on a single substrate, thereby reducing the number of external connections which must be made to the memory plane.

A problem which may arise in the construction of large memories embodying the invention is that of phase shift of the capacitive noise component $V_C$ relative to the information signals $V_L$ due to the different transmission properties of the bit lines at frequencies $f$ and $2f$. Similar phase shift may also occur due to differences in phase of voltage and current in the word lines because the capacitive noise is voltage dependent and the information signal is current dependent. These problems can be overcome by using high quality properly terminated strip transmission lines for the word and bit lines.

While the invention has been particularly shown and described with reference to a preferred embodiment thereof, it will be understood by those skilled in the art that various changes in form and details may be made therein without departing from the spirit and scope of the invention.

What I claim is:

1. A data storage device comprising
   a storage element,
   input and output lines coupled to said element,
   means for applying an oscillatory signal to said input line to produce a signal in said output line which includes an information bearing component having a harmonic relationship to said oscillatory signal and a phase indicative of the information stored by the storage element and a capacitive noise component at the frequency of the oscillatory signal,
   first means coupled to said output line for selecting said capacitive noise component,
   second means coupled to said output line for selecting said harmonically related signal component, and
   means coupled to said first and second means for determining the phase of said harmonically related signal component with reference to said capacitive noise component.

2. A data storage device as set forth in claim 1 in which said storage element includes
   an anisotropic magnetic film element having an easy axis of magnetization extending longitudinally of the input line and transversely of the output line.

3. A magnetic film memory comprising
   an array of anisotropic magnetic film data storage element arranged in rows and columns, each having an easy axis of magnetization extending transversely of the rows,
   a plurality of word lines each extending along a respective column of the array,
   a plurality of bit lines each extending along a respective row of the array,
   means for selectively applying an oscillatory signal of frequency $f$ and of amplitude insufficient to effect a permanent change of the magnetized state of said magnetic film elements to one of said word lines but of amplitude sufficient to effect changes in the magnetization of said film to induce in said bit lines an oscillatory signal of frequency $2f$ and to produce in said bit lines a capacitive noise component signal of frequency $f$,
   first means coupled to said bit lines for selecting said signal of frequency $2f$,
   second means coupled to said bit lines for selecting said noise component signal of frequency $f$, and
   means coupled to said first and second means for determining the phase of said signal of frequency $2f$ with reference to said noise component signal.

4. A magnetic film memory as set forth in claim 3 further including
   a plurality of decoding trees each coupled to a respective group of said bit lines and interposed between said bit lines and said first and second means.

5. A magnetic film memory as set forth in claim 4 in which each decoding tree comprises
   a plurality of tuned switches normally presenting a high impedance only to signals of frequency $2f$ and operable to present a low impedance to signals of frequency $2f$, whereby the combined capacitive noise signals of frequency $f$ from the bit lines of a group and the signal of frequency $2f$ from a selected bit line are supplied to said first and second means.

6. A memory as set forth in claim 5 wherein said second means includes
   a first band pass filter tuned to frequency $f$,
   said first means includes a second band pass filter tuned to frequency $2f$, and said phase determining means includes means for developing strobe signals from the output of the first band pass filter, a gate connected to the output of the second band pass filter and enabled by said strobe signals and an integrator coupled to said gate for integrating the output from said gate.

7. A memory as set forth in claim 3 in which said means for selectively applying an oscillatory signal to the word lines includes a word drive circuit for generating said oscillatory signal and a decoding tree for selectively connecting said word drive circuit to any one of said word lines, said decoding tree comprising a plurality of tuned switches normally presenting a high impedance to signals of frequency $f$ and operable to present a low impedance to signals of frequency $f$.

8. A memory as set forth in claim 3 further including writing means for entering data into said storage element including means to apply said oscillatory signal of frequency $f$ to a selected word line and simultaneously to apply oscillatory signals of frequency $2f$ to at least some of said bit lines, said writing means further including means for controlling the phase of the signals of frequency $2f$ relative to the signal of frequency $f$ in accordance with data required to be recorded in said magnetic film elements.